(12) United States Patent
Han et al.

(10) Patent No.: US 10,574,073 B2
(45) Date of Patent: Feb. 25, 2020

(54) ELECTRONIC DEVICE AND METHOD FOR CONTROLLING POWER SUPPLY

(71) Applicant: ASUS GLOBAL PTE. LTD., Singapore (SG)

(72) Inventors: Wei Han, Singapore (SG); Xiao-Feng Zhou, Singapore (SG); Ching-Ji Liang, Singapore (SG)

(73) Assignee: ASUS GLOBAL PTE. LTD., Singapore (SG)

( * ) Notice: Subject to any disclaimer, the term of this patent is extended or adjusted under 35 U.S.C. 154(b) by 542 days.

(21) Appl. No.: 14/979,542

(22) Filed: Dec. 28, 2015

(65) Prior Publication Data
US 2016/0190847 A1 Jun. 30, 2016

(30) Foreign Application Priority Data

Dec. 31, 2014 (CN) .......................... 2014 1 0855855

(51) Int. Cl.
*H02J 7/00* (2006.01)
*H02J 1/10* (2006.01)

(52) U.S. Cl.
CPC .............. *H02J 7/0055* (2013.01); *H02J 1/10* (2013.01)

(58) Field of Classification Search
CPC ...... H02J 7/0055; H02J 7/0068; H02J 7/0072; H02J 1/10
USPC ........................................................ 320/134
See application file for complete search history.

(56) References Cited

U.S. PATENT DOCUMENTS

| | | | |
|---|---|---|---|
| 8,473,761 B2 | 6/2013 | Rathi et al. | |
| 2009/0167245 A1 | 7/2009 | Nguyen | |
| 2014/0132213 A1* | 5/2014 | Wang | B60L 1/006 320/109 |
| 2014/0253086 A1* | 9/2014 | Rosu-Hamzescu | H03K 17/0822 323/311 |
| 2014/0266011 A1* | 9/2014 | Mehta | H02J 7/0042 320/107 |
| 2015/0280473 A1* | 10/2015 | Zhao | H02J 7/0052 320/107 |
| 2016/0094071 A1* | 3/2016 | Nge | H02J 7/0052 320/107 |

FOREIGN PATENT DOCUMENTS

| | | |
|---|---|---|
| CN | 101101582 A | 1/2008 |
| CN | 203387203 U | 1/2014 |
| CN | 102187544 B | 2/2014 |

* cited by examiner

*Primary Examiner* — Richard Isla
*Assistant Examiner* — Johali A Torres Ruiz
(74) *Attorney, Agent, or Firm* — CKC & Partners Co., LLC

(57) ABSTRACT

An electronic device and a method for controlling power supply are provided. The electronic device includes a first transmission port, a second transmission port, a switching power circuit and a control unit. The first transmission port is connected to a first external device, and the second transmission port is connected to a second external device. The switching power circuit is coupled to the first transmission port, the second transmission port and the power storage unit. The control unit controls the switching power circuit according to the voltage level of the first detecting pin of the first transmission port and the voltage level of the second detecting pin of the second transmission port, so as to make the first external device and the second external device to transmit power to the power storage unit.

6 Claims, 6 Drawing Sheets

ELECTRONIC DEVICE AND METHOD FOR CONTROLLING POWER SUPPLY

CROSS-REFERENCE TO RELATED APPLICATION

This application claims the priority benefit of China application serial No. 201410855855.2, filed on Dec. 31, 2014. The entirety of the above-mentioned patent applications are hereby incorporated by reference herein and made a part of specification.

BACKGROUND OF THE INVENTION

Field of the Invention

The disclosure relates to an electronic device and, more particularly, to a method for controlling power supply thereof.

Description of the Related Art

Currently, a transmission port, such as a universal serial bus (USB) port, of a consumer electronic device usually integrates a charging function to reduce size of the consumer electronic device.

However, the two functions cannot be executed by the transmission port at the same time. For example, the transmission port cannot be used to transmit data when the electronic device is recharging via the transmission port, and thus the data transmission efficiency of the electronic device is reduced. Similarly, the transmission port cannot be used for charging up the battery when the transmission port is utilized to transmit data, and thus the charging efficiency to the electronic device is reduced.

BRIEF SUMMARY OF THE INVENTION

According to a first aspect of the present disclosure, An electronic device, comprising a first transmission port connected to a first external device; a second transmission port connected to a second external device; a switching power circuit coupled to the first transmission port, the second transmission port and an power storage unit; and a control unit, wherein the control unit controls the switching power circuit according to a first electrical signal of a first detecting pin of the first transmission port and a second electrical signal of a second detecting pin of the second transmission port.

Furthermore, according to a second aspect of the present disclosure, A method for controlling power supply, applied to an electronic device, wherein the electronic device includes a control unit, a first transmission port and a second transmission port, the first transmission port and the second transmission port are used to connected to a first external device and a second external device, respectively, and the method for controlling power supply includes: receiving a first electrical signal and a second electrical signal by the control unit in the first transmission port and the second transmission port, respectively, to determine whether the first external device and the second external device are a first type or a second type according to the first electrical signal and the second electrical signal; and controlling a switching power circuit of the electronic device according to the first type or the second type and determining an operating state of the electronic device, the first external device and the second external device by the control unit.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
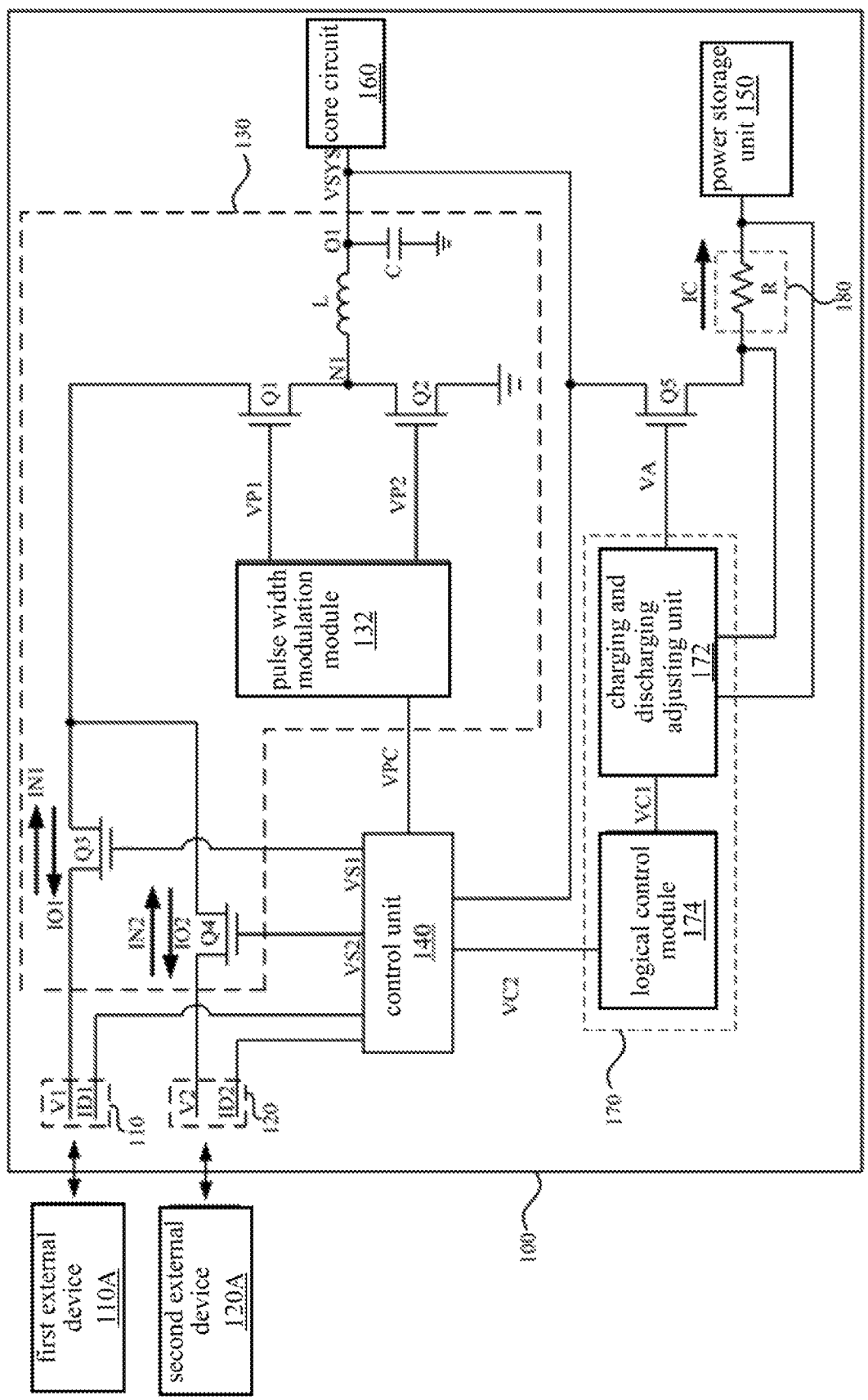
FIG. 1 is a schematic diagram showing an electronic device in an embodiment.

FIG. 1 is a schematic diagram showing an electronic device in an embodiment. In the embodiments, an electronic device 100 may be a personal computer, a notebook computer, a tablet computer or a smart phone, which is not limited herein.

As shown in FIG. 1, the electronic device 100 includes a first transmission port 110, a second transmission port 120, a switching power circuit 130, a control unit 140, a power storage unit 150 and a core circuit 160. The first transmission port 110 is connected to a first external device 110A to exchange data with the core circuit 160 or charge the power storage unit 150. The second transmission port 120 is connected to a second external device 120A to exchange data with the core circuit 160 or charge the power storage unit 150. In the embodiments, the first transmission port 110 and the second transmission port 120 is a universal serial bus (USB), or a micro USB, which is not limited herein.

The power storage unit 150 supplies power to the electronic device 100. In an embodiment, the power storage unit 150 supplies a driving voltage VSYS to the core circuit 160. In an embodiment, the power storage unit 150 is a rechargeable battery. The core circuit 160 can include a processor and/or a system control chip, which is not limited herein.

As shown in FIG. 1, the switching power circuit 130 includes a pulse width modulation (PWM) module 132, a first switch Q1, a second switch Q2, a third switch Q3, a fourth switch Q4, an inductor L and an capacitor C. The PWM module 132 is coupled to the control unit 140, which is used to receive the pulse control signal VPC and generate a first pulse signal VP1 and a second pulse signal VP2 according to the pulse control signal VPC.

A first terminal of the first switch Q1 is coupled to the first transmission port 110 via the third switch Q3, and the first terminal of the first switch Q1 is coupled to the second transmission port 120 via the fourth switch Q4, respectively. A second terminal of the first switch Q1 is coupled to a voltage node N1, and a control terminal of the first switch Q1 is coupled to the PWM module 132 to receive the first pulse signal VP1. A first terminal of the second switch Q2 is coupled to the voltage node N1, a second terminal of the second switching Q2 is coupled to the ground, and a control terminal of the second switch Q2 is coupled to the PWM module 132 to receive the second pulse signal VP2. A first terminal of the third switching Q3 is coupled to the first transmission port 110 to be connected to the first external device 110A, a second terminal of the third switch Q3 is coupled to the first terminal of the first switch Q1, and a control terminal of the third switch Q3 is coupled to the control unit 140 to receive the first switching signal VS1. A first terminal of the fourth switch Q4 is coupled to the second transmission port 120 to be connected to the second external device 120A, a second terminal of the fourth switch Q4 is coupled to the first terminal of the first switch Q1, and a control terminal of the fourth switch Q4 is coupled to the control unit 140 to receive the second switching signal VS2. The inductor L is coupled between the voltage node N1 and an output node O1. The capacitor C is coupled between the output node O1 and the ground to provide the driving voltage VSYS for the core circuit 160.

In the embodiment, the switching power circuit 130 can be a buck converter, which is not limited herein. The type of the switching power circuit 130 can be determined according to the practical requirements. The first switch Q1 is selectively conducted according to the first pulse signal VP1, and the second switch Q2 is selectively conducted according to the second pulse signal VP2 to adjust the current of the inductor L and the capacitor C to adjust the driving voltage VSYS. The third switch Q3 is selectively conducted according to the first switch signal VS1 to adjust a current IN1 from the first external device 110A or a current IO1 from the power storage unit 150. The fourth switch Q4 is selectively conducted according to the second switching signal VS2 to adjust a current IN2 from the second external device 120A or a current IO2 from the power storage unit 150.

As shown in FIG. 1, the first transmission port 110 at least includes a connecting pin V1 and a first detecting pin ID1. A connecting pin V1 is coupled to the first terminal of the third switch Q3 to exchange data or power with the first external device. The first detecting pin ID1 is coupled to the control unit 140, and the voltage level of the first detecting pin ID1 is different along with changed types of the first external device 110A. The detail is described hereinafter.

Similarly, the second transmission port 120 at least includes a connecting pin V2 and a second detecting pin ID2. The connecting pin V2 is coupled to the first terminal of the fourth switch Q4 to exchange data or power with the first external device. The second detecting pin ID2 is coupled to the control unit 140, and the voltage level of second detecting pin 1D2 is different along with changed types of the second external device 120A.

The control unit 140 generates the first switch signal VS1, the second switching signal VS2 and the pulse control signal VPC correspondingly according to a first voltage level and a second voltage level to control the switching power circuit 130. As a result, the electronic device 100 can execute different operations, respectively, according to the different types of the first external device 110A and the second external device 120A. In an embodiment, the first external device 110A and the second external device 120A charge the power storage unit 150 simultaneously; the first external device 110A charges the power storage unit 150 and supplies power to the second external device 120A, and the second external device 120A exchanges data with the core circuit 160 simultaneously; and the first external device 110A and the second external device 120A exchange data with the core circuit 160 simultaneously.

In an embodiment, the electronic device 100 further includes a fifth switch Q5, a charging and discharging control unit 170 and a detecting component 180. The detecting component 180 is coupled between the fifth switch Q5 and the power storage unit 150. The type of the detecting component 180 includes various types of detecting components which are used to detect a voltage or a current of the charging and discharging state of the power storage unit 150. In an embodiment, as shown in FIG. 1, the detecting component 150 is a resistor R, which is not limited herein. The resistor R is coupled to the power storage unit 150. The resistor R is used to detect a current of a charging current IC passing through the power storage unit 150 to detect the charging and discharging state of the power storage unit 150. The charging and discharging control unit 170 includes a charging and discharging adjusting unit 172 and a logical control module 174. The first terminal of the fifth switch Q5 is coupled to the output node O1, the second terminal of the fifth switch Q5 is coupled to a terminal of the resistor R terminal, and the control terminal of the fifth switch Q5 is coupled to the charging and discharging adjusting unit 172 to receive the adjusting signal VA.

The charging and discharging adjusting unit 172 is coupled to the resistor R and the fifth switch Q5, and the charging and discharging adjusting unit 172 generates the adjusting signal VA according to the control signal VC1. The logical control module 174 is communicated with the core circuit 160, and the logical control module 174 generates the control signal VC1 according to the load state of the core circuit 160 and the charging and discharging state of the power storage unit 150. Additionally, the logical control module 174 is further used to generate the control signal VC2 to the control unit 140 to control the switching power circuit 130 to adjust the power received via the first external device 110A or the second external device 120A. In an embodiment, the logical control module 174 is a logical control circuit of an inter-integrated circuit (I2C).

In an embodiment, when the core circuit 160 needs a high driving current, the logical control module 174 generates the corresponding control signal VC1 according to the current charging and discharging state of the power storage unit 150 to make the charging and discharging adjusting unit 172 to output the corresponding adjusting signal VA to adjust the conduction degree of the fifth switch Q5, and then the power storage unit 150 can output a large current to the core circuit 160.

Figure 2A:
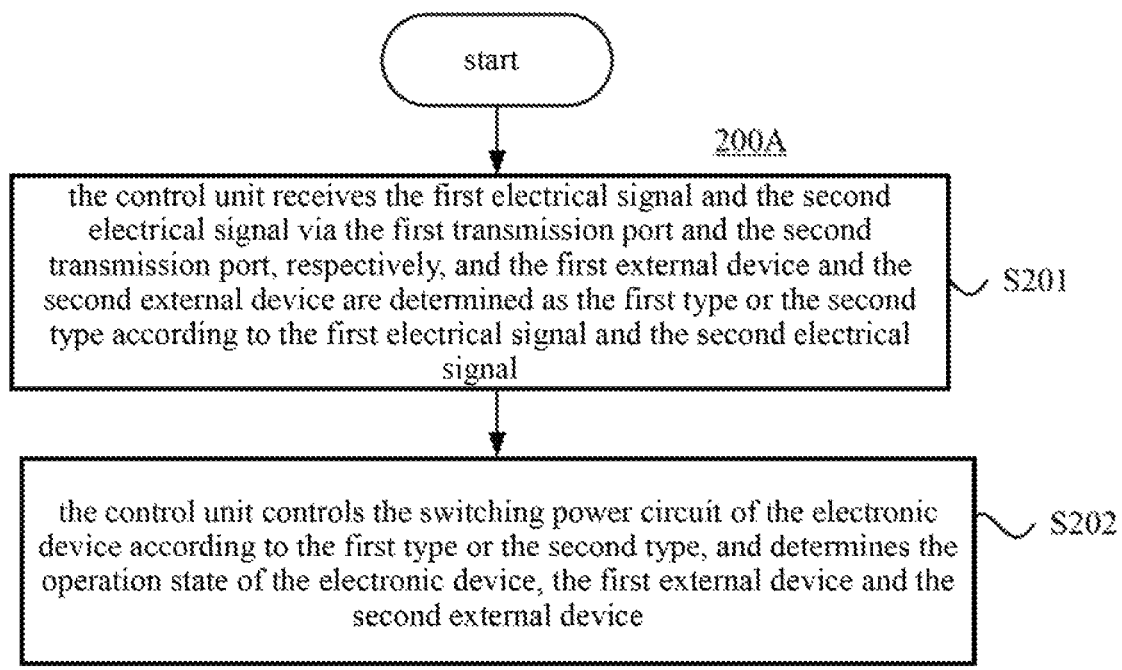
FIG. 2A is a flow chart showing a method for controlling power supply in an embodiment.

Please refer to FIG. 1 and FIG. 2A. FIG. 2A is a flow chart showing a method for controlling power supply in an embodiment. Functions and the related operations of the electronic device 100 are illustrated in details cooperating with the method for controlling power supply 200A.

As shown in FIG. 2A, the method for controlling power supply 200A includes step S201 and step S202. In step S201, the control unit 140 receives the first electrical signal and the second electrical signal via the first transmission port 110 and the second transmission port 120, respectively, to determine the first external device 110A and the second external device 120A to be the first type or the second type according to the first electrical signal and the second electrical signal.

In step S202, the control unit 140 controls the switching power circuit 130 according to the first type or the second type, and the operation state of the electronic device 100, the first external device 110A and the second external device 120A are determined.

In an embodiment, the first electrical signal transmitted from the first external device 110A adjusts the voltage level of a pin (such as the first detecting pin ID1) of the first transmission port 110, and the second electrical signal transmitted from the second external device 120A adjusts the voltage level of a pin (such as the second detecting pin 1D2) of the second transmission port 120. Consequently, the control unit 140 can determine whether the first external device 110A and the second external device 120A are the first type or the second type according to the voltage level of the first transmission port 110 and the voltage level of the second transmission port 120, respectively.

The functions and operation of the electronic device 100 are illustrated in details cooperating with the following embodiments, and the disclosure is not limited herein.

Figure 2B:
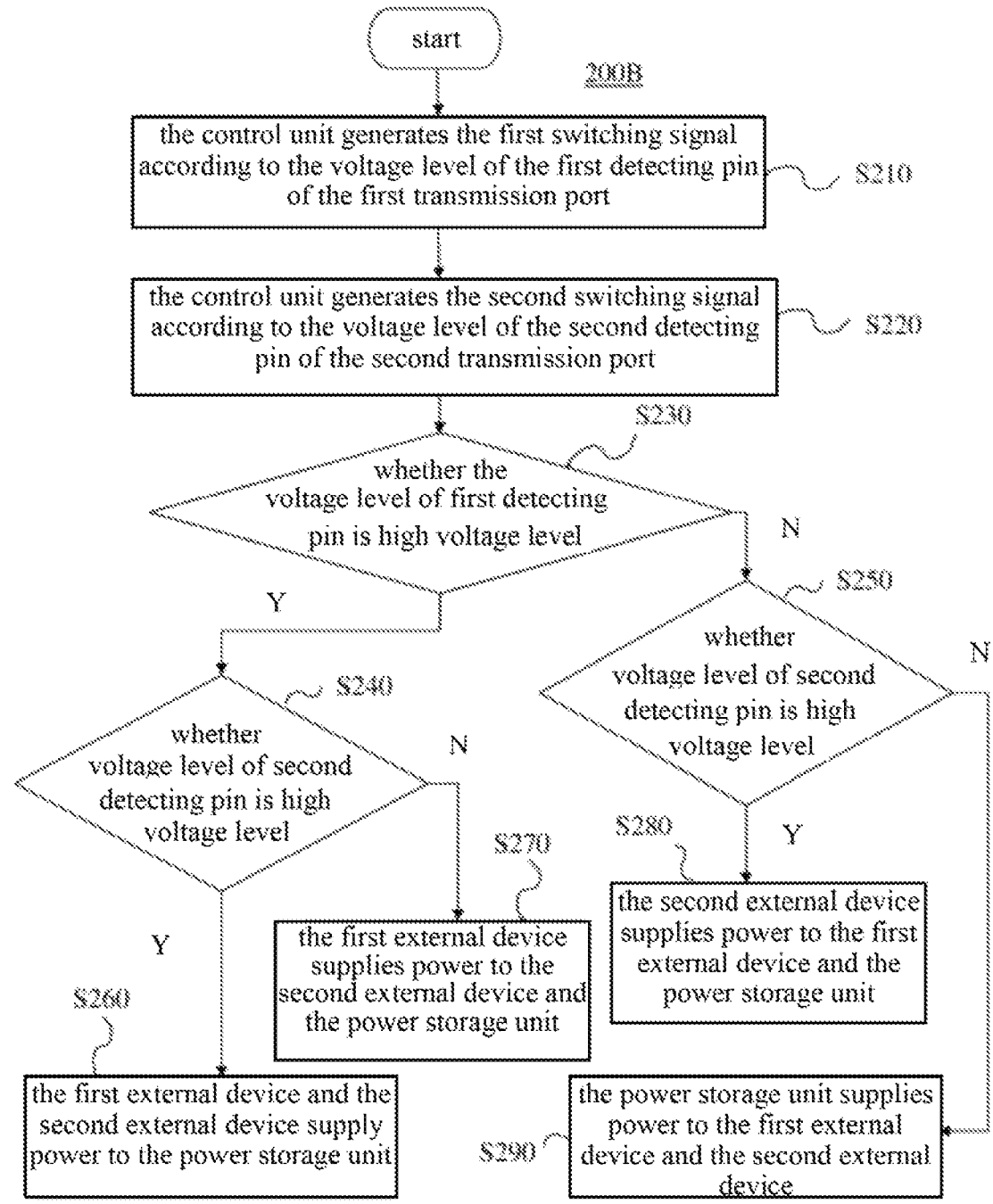
FIG. 2B is a flow chart showing a method for controlling power supply in an embodiment.
Figure 3A:
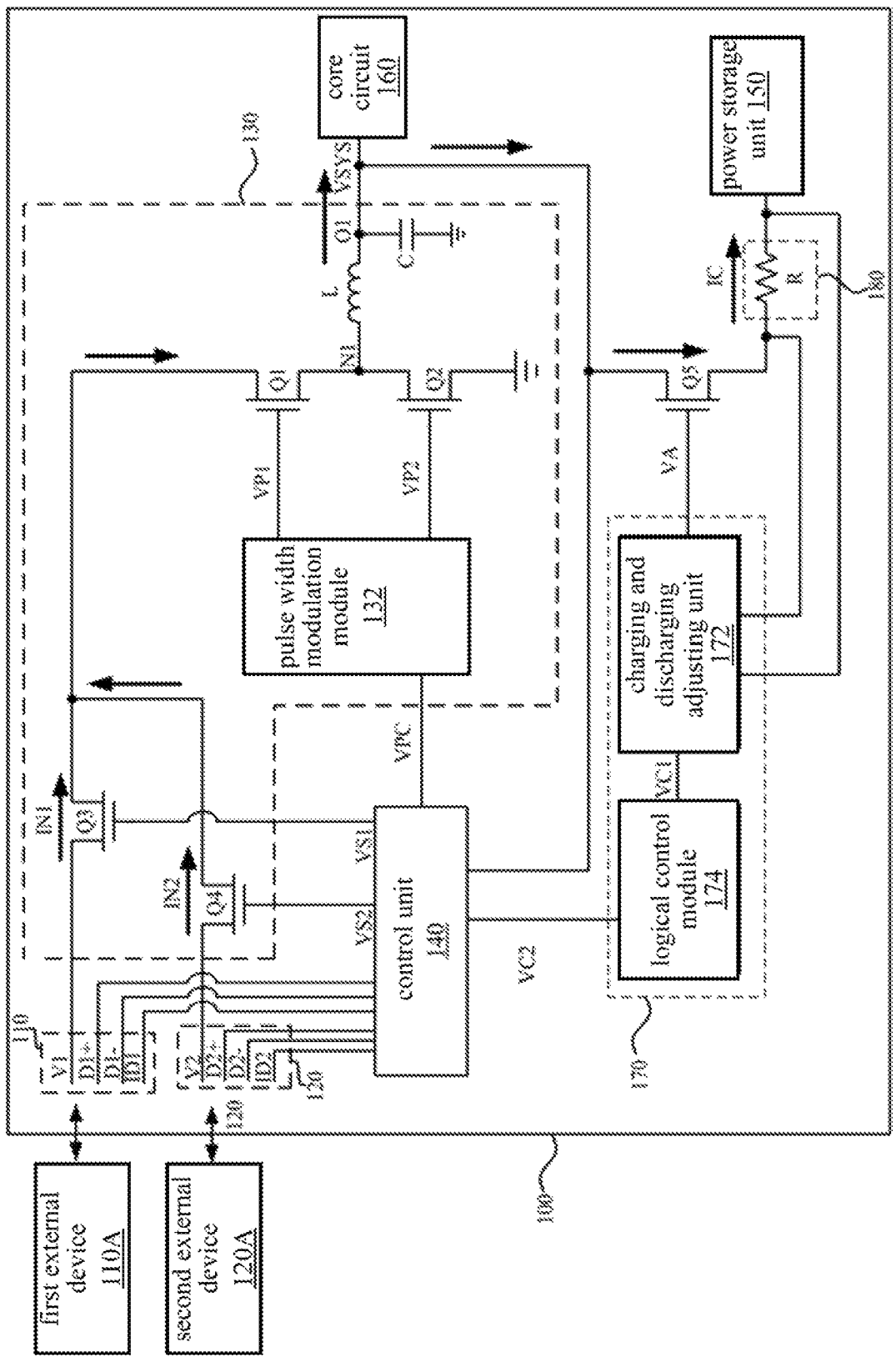
FIG. 3A is a schematic diagram showing that the electronic device in FIG. 1 is connected to a first external device and a second external device in an embodiment.

Please refer to FIG. 2B and FIG. 3A. FIG. 2B is a flow chart showing a method for controlling power supply in an embodiment. FIG. 3A is schematic diagram showing that the electronic device in FIG. 1 is connected to a first external device and a second external device in an embodiment. The operation of the electronic device 100 cooperating with the method for controlling power supply 200B is described herein. In the embodiment, the first transmission port 110 and the second transmission port 120 are Micro USBs, which is not limited herein.

The method for controlling power supply 200B includes step S210, step S220, step S230 and step S240. In step S210, the control unit 140 generates the first switching signal VS1 according to the voltage level of the first detecting pin ID1 of the first transmission port 110. In step S220, the control unit 140 generates the second switching signal VS2 according to the voltage level of the second detecting pin ID2 of the second transmission port 120.

In step S230, the control unit 140 determines whether the voltage level of the first detecting pin ID1 is the high voltage level. If yes, step S240 is executed. If not, step S250 is executed.

In step S240, the control unit 140 determines whether the voltage level of the second detecting pin ID2 is the high voltage level. If yes, step S260 is executed. If not, step S270 is executed.

In step S260, if both the voltage level of the first detecting pin ID1 and the voltage level of the second detecting pin ID2 are the high voltage level, the control unit 140 makes the first external device 110A and the second external device 120A to supply power to the power storage unit 150 by controlling the third switch Q3 and the fourth switch Q4 of the switching power circuit 130.

As shown in FIG. 3A, if both the voltage level of the first detecting pin ID1 and the voltage level of the second detecting pin ID2 are the high voltage level, that means, the transmission port connected to the first transmission port 110 and the transmission port connected to the second transmission port 120 are dedicated charging ports (DCP). In other words, when the first external device 110A and the second external device 120A are a charger (such as a AC-DC converter), the control unit 140 generates the first switching signal VS1 and the second switching signal VS2 correspondingly to conduct the third switch Q3 and the fourth switch Q4 to supply power to the core circuit 160 simultaneously via the first external device 110A and the second external device 120A. At this time, the charging and discharging adjusting unit 172 controls the fifth switch Q5 to raise the charging current IC of the power storage unit 150.

In other words, if both the first external device 110A and the second external device 120A are determined the electronic device of the first type (such as the charger), the first external device 110A and the second external device 120A are configured to transmit power to the electronic device 100, respectively.

Please refer to FIG. 2B again, in step S270, if the voltage level of the first detecting pin ID1 is the high voltage level, and the voltage level of the second detecting pin ID2 is the low voltage level, the control unit 140 makes the first external device 110A to supply power to the second external device 120A and the power storage unit 150 by controlling the third switch Q3 and the fourth switch Q4 of the switching power circuit 130.

Figure 3B:
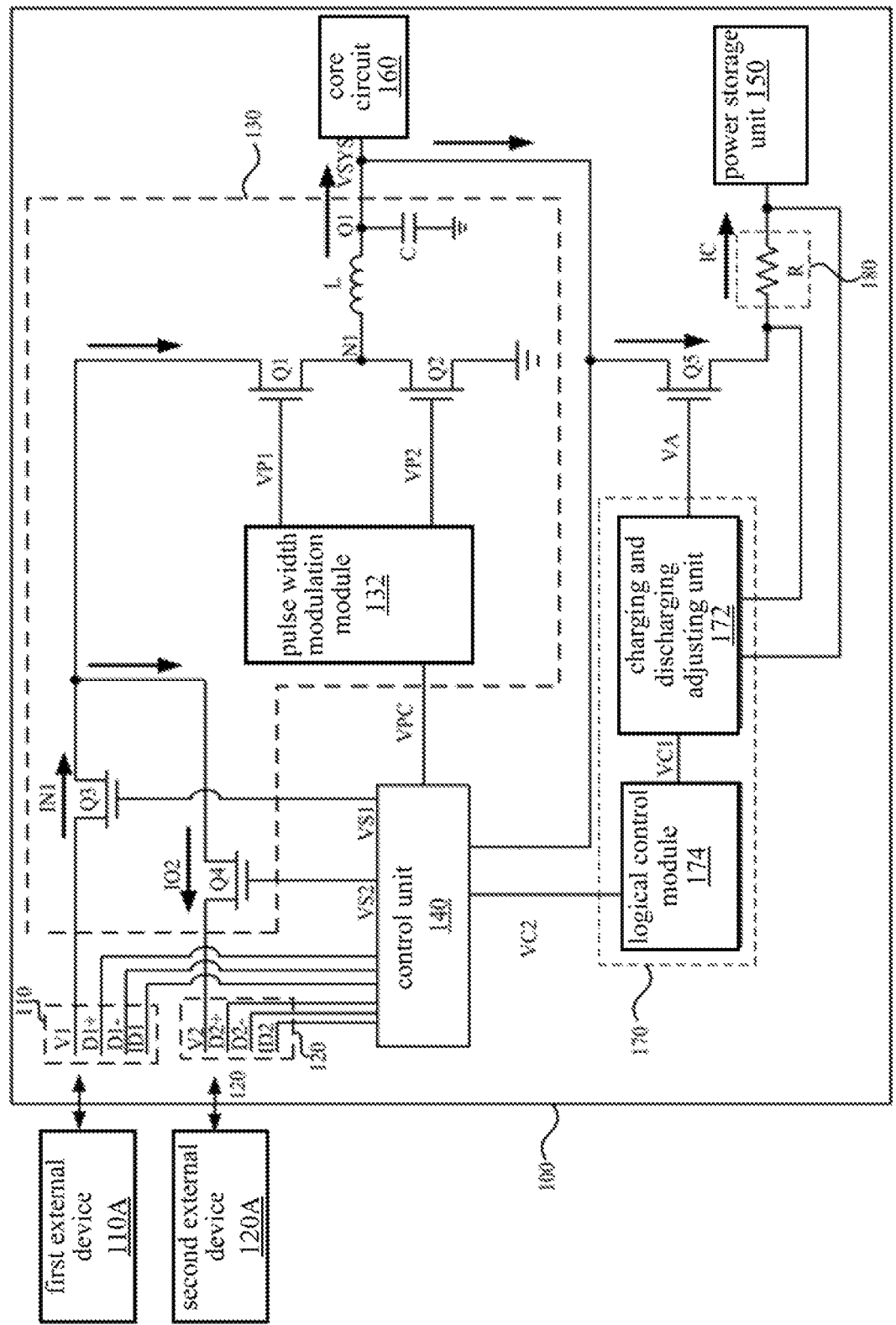
FIG. 3B is a schematic diagram showing that electronic device in FIG. 1 is connected to a first external device and a second external device in an embodiment.

FIG. 3B is a schematic diagram showing that the electronic device in FIG. 1 is connected to a first external device and a second external device in an embodiment.

As shown in FIG. 3B, in the embodiment, if the voltage level of the first detecting pin ID1 is the high voltage level, that means, the transmission port connected to the first transmission port 110A is a dedicated charging port (DCP); if the voltage level of the second detecting pin ID2 is the low voltage level, that means, the transmission port connected to the second transmission port is a standard downstream port (SDP) or a charging downstream port (CDP).

In the embodiment, the first external device 110A is a charger (the electronic device of the first type), and the second external device 120A is a peripheral device with a USB ON-THE-GO (OTG) function (the electronic device of the second type), such as a flash drive, a mouse or a keyboard, which is not limited herein.

At the time, the control unit 140 generates the first switching signal VS1 and the second switching signal VS2 correspondingly to conduct the third switch Q3 and the fourth switch Q4 to make the first external device 110A to supply power to the second external device 120A, the power storage unit 150 and the core circuit 160. Simultaneously, the control unit 140 sets the second transmission port 120 as an OTG transmission port, and the control unit 140 makes the current IO2 passing through the fourth switch Q4, which is about 1 A, by controlling the conduction degree of the fourth switch Q4. Consequently, the electronic device 100 can be charged via the first external device 110A and exchange data with the second external device 120A via the second transmission port 120, respectively.

In the embodiment, if the first external device 110A is determined to be the electronic device of the first type, and the second external device 120A is determined to be the electronic device of the second type, the first external device 110A are configured to transmit power to the electronic device 100 and the second external device 120A.

Additionally, in the embodiment, the control unit 140 controls the power supplied to the core circuit 160 preferentially. In an embodiment, when the power supplied to the core circuit 160 is not sufficient, the logical control module 174 generates the control signal VC2 to the control unit 140, the control unit 140 adjusts the fourth switch Q4 accordingly to reduce the current IO2. If the power supplied to the core circuit 160 is still not sufficient after the current IO2 is reduced, the logical control module 174 further generates the control signal VC1, and then the charging and discharging adjusting unit 172 adjusts the fifth switch Q5 to reduce the charging current IC. As a result, it can ensure that the core circuit 160 is operated under an enough driving voltage VSYS, and the system reliability of the electronic device 100 is improved.

In step S250, the control unit 140 determines whether the voltage level of the second detecting pin ID2 is the high voltage level. If yes, step S280 is executed. If not, step S290 is executed. In step S280, if the voltage level of the first detecting pin ID1 is the low voltage level and the voltage level of the second detecting pin ID2 is the high voltage level, the control unit 140 controls the switching power circuit 130 to make the second external device 120A to supply power to the first external device 110A, the power storage unit 150 and the core circuit 160, and the control unit 140 makes the core circuit 160 to exchange data with the first external device 110A. The above operations are similar to that of step S270 and FIG. 3B, which are omitted herein.

In step S290, if both the voltage level of the first detecting pin ID1 and that of the second detecting pin ID2 are the tow voltage level, the control unit 140 controls the third switch Q3 and the fourth switch Q4 of the switching power circuit 130 to make the power storage unit 150 supply power to the first external device 110A and the second external device 120A, and the first external device 110A and the second external device 120A can exchange data with the core circuit 160.

Figure 3C:
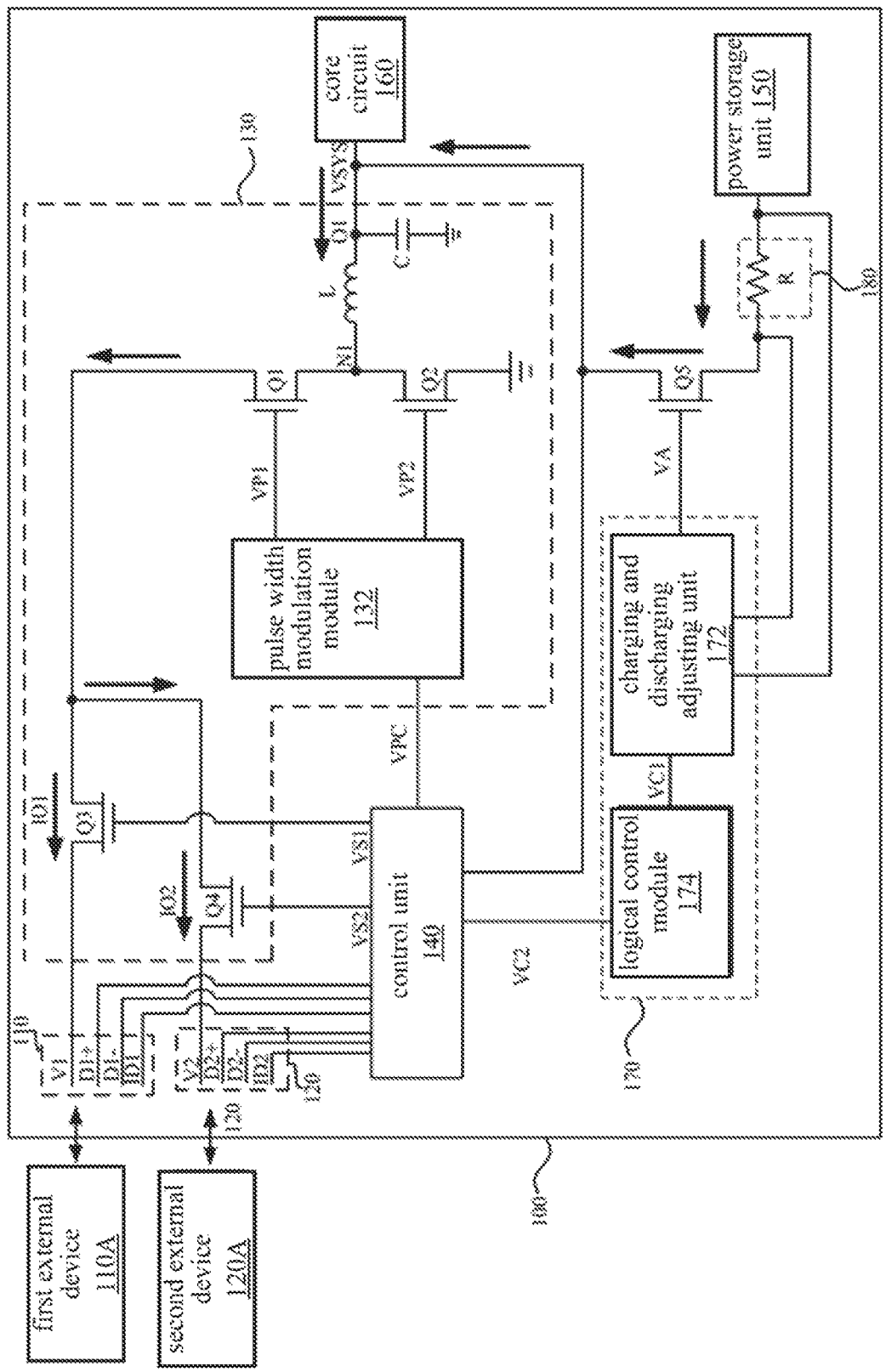
FIG. 3C is a schematic diagram showing that the electronic device in FIG. 1 is connected to a first external device and a second external device in an embodiment.

FIG. 3C is a schematic diagram showing that the electronic device in FIG. 1 is connected to a first external device and a second external device in an embodiment.

As shown in FIG. 3C, in the embodiment, if both the voltage level of the first detecting pin ID and that of the second detecting pin ID2 are at the low voltage level, that means, the transmission port connected to the first transmission port 110 and the transmission port connected to the second transmission port 120 are a standard downstream port (SDP) or a charging downstream port (CDP), respectively. In the embodiment, both the first external device 110A and the second external device 120A are the peripheral devices with the USB OTG function.

At the time, the control unit 140 sets the first transmission port 110 and the second transmission port 120 as the OTG transmission ports, and the control unit 140 generates the first switching signal VS1 and the second switching signal VS2 correspondingly to conduct the third switch Q3 and the fourth switch Q4 to make the power storage unit 150 to supply power to the first external device 110A and the second external device 120A. The control unit 140 controls the current IO1 and the current IO2 around 1 A by controlling the conduction degree of the third switch Q3 and the fourth switch Q4. As a result, the electronic device 100 exchanges data with the first external device 110A and the second external device 120A simultaneously.

Similarly, in the embodiment, when the power applied to the core circuit 160 is not sufficient, the logical control module 174 generates the control signal VC2 to the control unit 140. Then, the control unit 140 controls to reduce the current IO1 or the current IO2 by controlling the third switch Q3 and the fourth switch Q4, or the control unit 140 controls the power storage unit 150 to stop supplying power to the first external device 110A and the second external device 120A. As a result, the core circuit 160 is operated under an enough driving voltage VSYS.

As shown in FIG. 3A to FIG. 3C, in an embodiment, the first transmission port 110 further includes an detecting pin D1+ and an detecting pin D1−, the second transmission port 120 further includes an detecting pin D2+ and an detecting pin D2−. As a result, the control unit 140 determines the type of the transmission port connected to the first transmission port 110 and the transmission port connected to the second transmission port 120, respectively, according to the voltage level of the detecting pins D1+, D1−, D2+ and D2− to confirm the type of the first external device 110A and the second external device 120A. In other embodiments, the electronic device 100 utilizes other transmission protocols to determine the type of the transmission ports connected to the first transmission port 110 and the second transmission port 120, respectively, which is not limited herein.

In above embodiments, components of the electronic device 100 can be various types of digital circuits or analog circuits or different integrated circuit chips. All components of the electronic device 100 can be integrated into a digital control chip, which is not limited herein.

Although the main body has been disclosed with reference to certain preferred embodiments thereof, the disclosure is not for limiting the scope. Persons having ordinary skill in the art may make various modifications and changes without departing from the spirit and the scope of the disclosure. Therefore, the scope of the appended claims should not be limited to the description of the preferred embodiments described above.

What is claimed is:

1. An electronic device, comprising:
   a first transmission port connected to a first external device;
   a second transmission port connected to a second external device;
   a switching power circuit coupled to the first transmission port, the second transmission port and a power storage unit; and
   a control unit, wherein the control unit controls the switching power circuit according to a first electrical signal of a first detecting pin of the first transmission port and a second electrical signal of a second detecting pin of the second transmission port,
   wherein the switching power circuit includes:
   a pulse width modulation (PWM) module, wherein the PWM module generates a first pulse signal and a second pulse signal according to a pulse control signal;
   a first switch selectively conducted according to the first pulse signal;
   a second switch selectively conducted according to the second pulse signal;
   a third switch coupled between the first switch and the first transmission port and selectively conducted according to a first switching signal; and
   a fourth switch coupled between the first switch and the second transmission port and selectively conducted according to a second switching signal,
   wherein in response to the voltage level of the first detecting pin being high and the voltage level of the second detecting pin being low, the control unit generates the first switching signal and the second switching signal to respectively conduct the third switch and the fourth switch in a manner to make the first external device supply power to the second external device and the electronic device.

2. The electronic device according to claim 1, wherein the control unit generates the pulse control signal, the first switching signal and the second switching signal according to the first electrical signal and the second electrical signal.

3. The electronic device according to claim 1, wherein the switching power circuit further includes:
   an inductor coupled to the first switch and the second switch; and
   a capacitor coupled to the inductor.

4. The electronic device according to claim 1, further comprising:
   a charging and discharging control unit configured to generate an adjusting signal according to a charging and discharging state of the power storage unit; and
   a fifth switch selectively conducted according to the adjusting signal.

5. The electronic device according to claim 4, further comprising:
   a detecting component coupled between the fifth switch and the power storage unit to detect the charging and discharging state.

6. The electronic device according to claim 4, wherein the charging and discharging control unit includes:
   a charging and discharging adjusting unit coupled to a resistor and the fifth switch, and configured to generate the adjusting signal according to a control signal; and a logical control module communicated with a core circuit of the electronic device, configured to generate the control signal according to the charging and discharging state.

* * * * *